US009750264B2

(12) United States Patent
Metcalf et al.

(10) Patent No.: US 9,750,264 B2
(45) Date of Patent: Sep. 5, 2017

(54) PERFORATED PLATE FOR MEAT GRINDING RECLAMATION SYSTEM

(71) Applicant: Rome, Ltd., Sheldon, IA (US)

(72) Inventors: Philip Charles Alexander Metcalf, Thamesford (CA); Charles Arthur William Metcalf, London (CA)

(73) Assignee: Rome, Ltd., Sheldon, IA (US)

( * ) Notice: Subject to any disclaimer, the term of this patent is extended or adjusted under 35 U.S.C. 154(b) by 0 days.

(21) Appl. No.: 14/059,524

(22) Filed: Oct. 22, 2013

(65) Prior Publication Data

US 2015/0108261 A1    Apr. 23, 2015

(51) Int. Cl.
*B02C 18/16* (2006.01)
*B02C 18/14* (2006.01)
*A22C 17/00* (2006.01)
*B02C 18/30* (2006.01)

(52) U.S. Cl.
CPC .......... *A22C 17/0026* (2013.01); *B02C 18/30* (2013.01); *B02C 2018/308* (2013.01)

(58) Field of Classification Search
CPC ..... B02C 18/302; B02C 18/30; B02C 18/305; B02C 18/301; B02C 18/36; B02C 18/00; B02C 18/141; B02C 2018/308; A47J 19/025; A22C 17/0026
USPC ................................................ 241/82.1–82.7
See application file for complete search history.

(56) References Cited

U.S. PATENT DOCUMENTS

| | | | | |
|---|---|---|---|---|
| 3,934,827 A * | 1/1976 | Seydelmann | ................... | 241/84 |
| 4,004,742 A | 1/1977 | Hess | | |
| 4,358,061 A * | 11/1982 | Richter | ................... | 241/82.4 |
| 4,699,325 A * | 10/1987 | Hess | ................... | 241/82.5 |
| 5,443,214 A * | 8/1995 | Lesar | ................... | 241/82.2 |
| 7,484,680 B2 | 2/2009 | Lesar et al. | | |
| 7,744,025 B2 * | 6/2010 | Albrecht et al. | ............. | 241/82.7 |
| 8,584,978 B2 | 11/2013 | Lesar et al. | | |
| 2007/0090220 A1 * | 4/2007 | Lesar et al. | ................. | 241/82.5 |
| 2009/0080607 A1 * | 3/2009 | Hoffmann et al. | ............. | 378/53 |

* cited by examiner

*Primary Examiner* — Faye Francis
*Assistant Examiner* — Onekki Jolly
(74) *Attorney, Agent, or Firm* — Brinks Gilson & Lione

(57) ABSTRACT

A meat grinding reclamation system is disclosed herein. The system uses a plate having a plurality of holes through which meat is processed, and a smaller number of waste material indentations that feed waste material away from the meat into separate uniform curved openings. The center of the plate is provided with a shaft opening, which allows use of a center drive shaft across the plate.

7 Claims, 11 Drawing Sheets

PERFORATED PLATE FOR MEAT GRINDING RECLAMATION SYSTEM

TECHNICAL FIELD

The present invention relates, in general, to a meat grinding reclamation system and, more particularly, to a system for grinding and reclaiming meat in a two-stage coaxial process.

BACKGROUND OF THE INVENTION

Modern meat grinding systems not only grind meat, but also separate meat from undesirable material, such as gristle, hard fat, connective tissue, sinew, and bone. Such systems typically provide the unprocessed meat to a pump or screw system, which delivers the unprocessed meat to a knife rotating against a perforated plate. The knife cuts the meat into smaller pieces as the pump or screw forces the meat through the perforated plate. Centrifugal force generated by the pump or rotating screw drives the meat toward the perimeter of the plate and concentrates the undesirable material near the center of the plate. The plate typically contains an opening into a pipe that directs the undesirable material to a storage container. Once enough of the undesirable material has been collected, the undesirable material is fed through a second meat grinding system to further separate any remaining meat from the undesirable material in a reclamation process similar to that described above. The meat reclaimed from the undesirable material is then added back to the meat ground in the initial pass and the further resulting undesirable material is discarded or otherwise processed separately.

One drawback associated with such prior art devices is the use of large troughs or indentations in the plate to direct waste material to the collection passage, once the waste material is separated from the meat. It would be desirable to reduce the size of the indentations, to increase the number of holes in the plate available to process the meat.

Another drawback associated with such prior art devices is the placement of the waste material curved opening at the center of the plate, preventing use of the drive shaft to drive beyond the plate. It would be desirable to relocate the curved opening to allow use of the drive shaft beyond the plate. The difficulties encountered discussed here and above are substantially eliminated by the present invention.

SUMMARY OF THE DISCLOSED SUBJECT MATTER

A system for grinding and reclaiming meat is provided with a first meat grinder and a second meat grinder. Each meat grinder is provided with a perforated plate and a screw. A drive shaft is coupled to the screw of the first grinder, passed through the first perforated plate, and is coupled to the screw of the second grinder. A first rotating knife is coupled to the drive shaft near the first perforated plate, and a second knife is coupled to the drive shaft near the second perforated plate. The first perforated plate is provided with an outlet that sends undesirable material from the first grinder into the second grinder. An outlet is coupled to the second perforated plate to remove undesirable material from the second grinder. A pressurized system is coupled to the outlet of the second grinder to adjust the backpressure of the undesirable material on the meat in the second grinder.

One aspect of the meat grinding assembly is the use of a single drive shaft to power the first screw, the second screw, the first knife, and the second knife.

Another aspect of the meat grinding assembly relates to outlets being provided around the drive shaft in fluid communication with the second grinder.

Another aspect of the meat grinding assembly is the coaxial orientation of the first meat grinder and the second meat grinder.

These and other aspects will be more readily understood by reference to the following description and figures.

BRIEF DESCRIPTION OF THE DRAWINGS

The present invention will now be described, by way of example, with reference to the accompanying drawings in which.

DETAILED DESCRIPTION OF THE DRAWINGS

Figure 1:
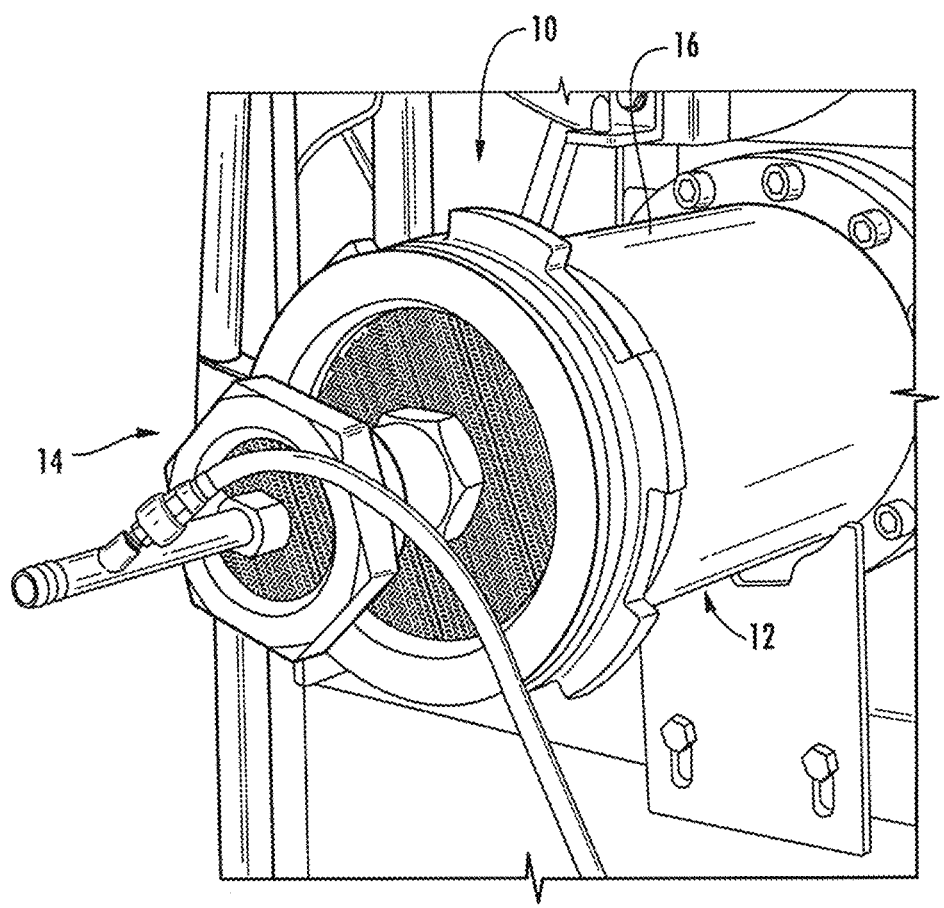
FIG. 1 illustrates a front perspective view of the meat grinding assembly of the present invention.

A meat grinding assembly is shown generally as 10 in FIG. 1. The embodiments of the invention described below are illustrated only and are not to be interpreted by limiting the scope of the present invention.

Figure 2:
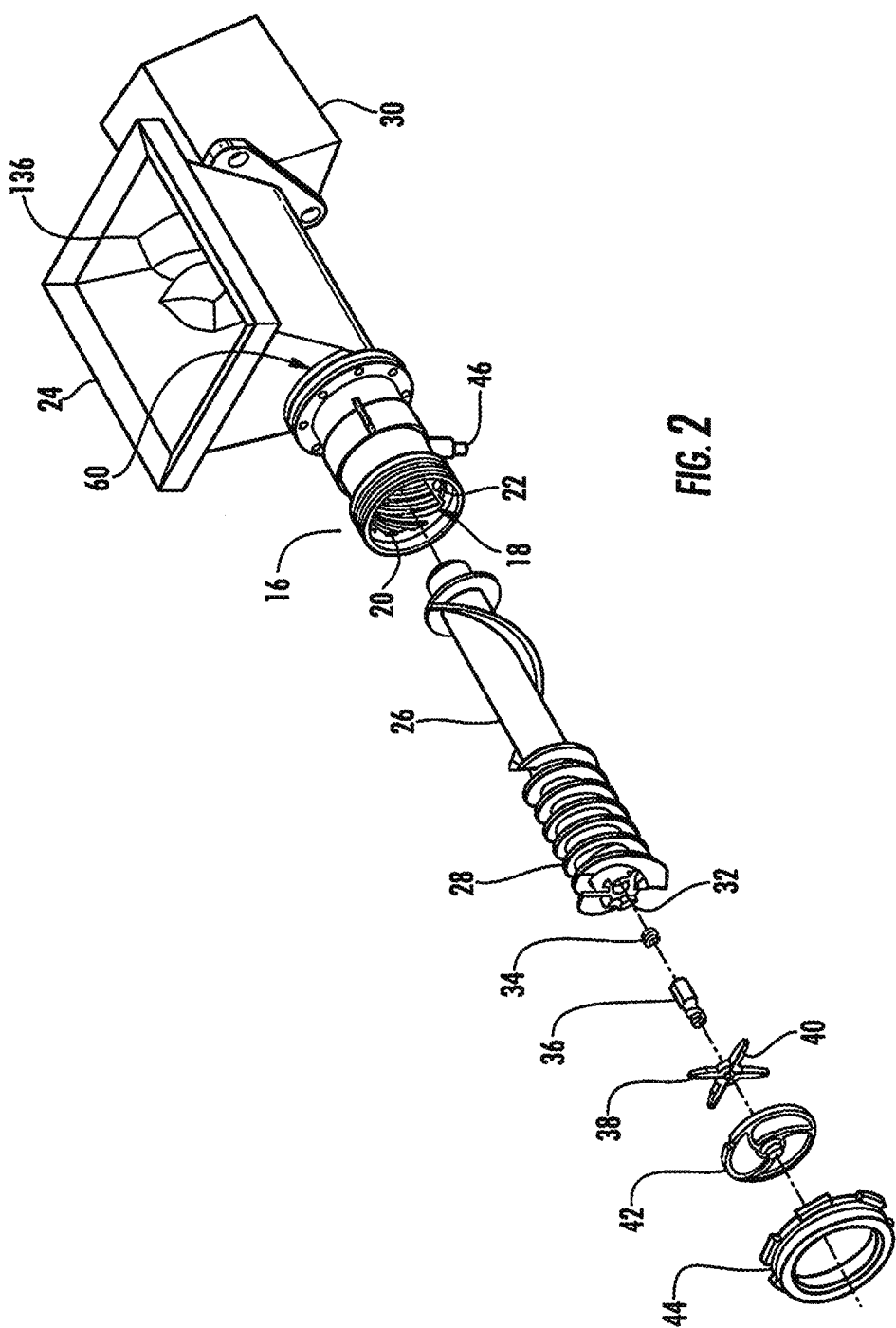
FIG. 2 illustrates an exploded view of the rear of the meat grinding assembly of FIG. 1.
Figure 3:
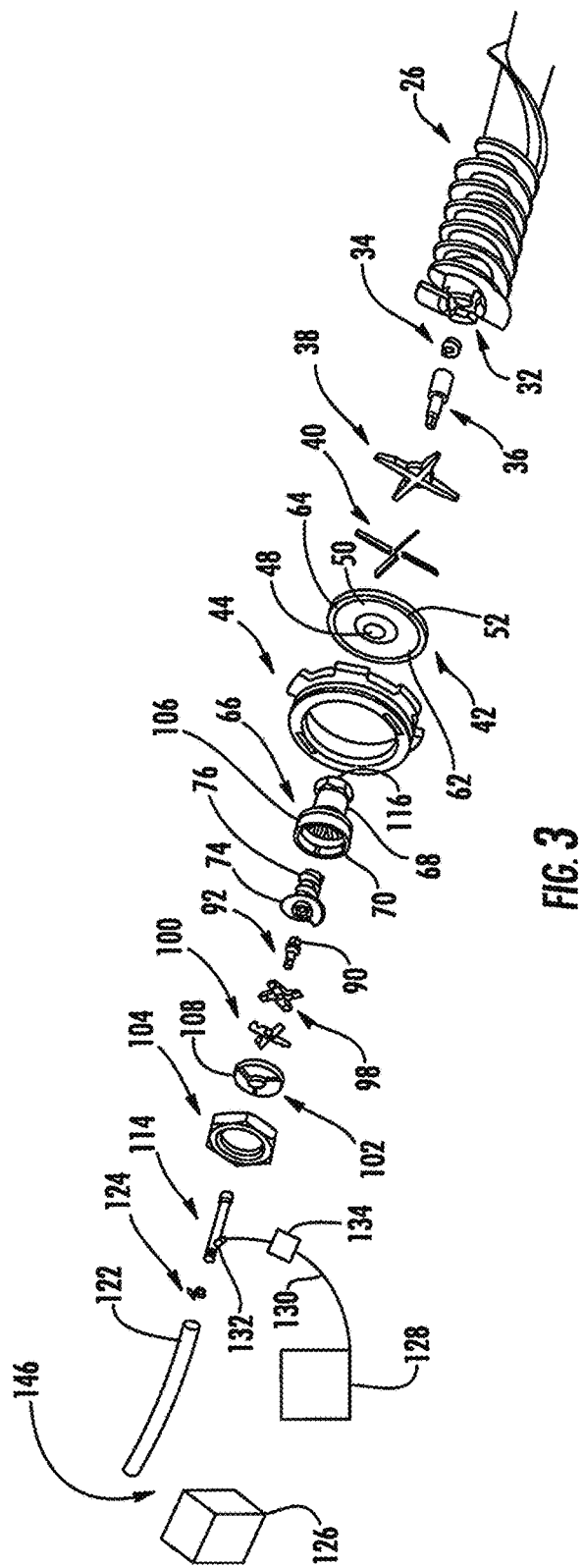
FIG. 3 illustrates an exploded view of the front of the meat grinding assembly of FIG. 1.

The meat grinding assembly 10 has a first meat grinder 12 and a second meat grinder 14. As shown in FIG. 2, the first meat grinder 12 is provided with a first grinder housing 16 provided with interior rifling 18 of the lands 20 and grooves 22 (FIGS. 1-3). Coupled to the first grinder housing 16 is a hopper 24, which is preferably provided with a capacity of between 1-5000 kg, more preferably between 10-2000 kg, and most preferably between 750-1250 kg. Provided within the first grinder housing 16 and hopper 24 is a first drive shaft 26 provided with a plurality of flights 28. The first drive shaft 26 is coupled to a motor 30. The motor 30 may be of any type known in the art and may be single speed, multiple speed, or variable speed.

The first drive shaft 26 is provided with a center slot 32 into which is provided a compression spring 34. Provided in the center slot 32 over the compression spring 34 is a first stud pin 36. A first knife blade holder 38, having four arms 37, is provided with a center opening 39 only slightly larger than the diameter of the first stud pin 36. The knife blade holder 38 may, of course, be provided with any desired number of arms 37, or any desired configuration. The center opening 39 of the first knife blade holder 38 is provided over the first stud pin 36, and the arms 37 of the first knife blade holder 38, fit into mating engagement with slots 41 provided in the end of the first drive shaft 26. The slots 41 are preferably provided slightly larger than the arms 37 of the first knife blade holder 38 to prevent undesired play between the first knife blade holder 38 and the first drive shaft 26.

Provided in the first knife blade holder 38 are four knife inserts 40. The first knife blade holder 38 and knife inserts 40 are preferably slightly longer than prior art blades to provide a more desirable cutting stroke when used in association with the present invention. Additionally, the first knife blade holder 38 and knife inserts 40 are recessed from a first perforated plate 42 provided over the knife blade holder 38 and knife inserts 40 and retained to the first grinder housing 16 by a first ring nut 44 screwed onto mating engagement with first threads 46 provided on the exterior of the first grinder housing 16.

Figure 4:
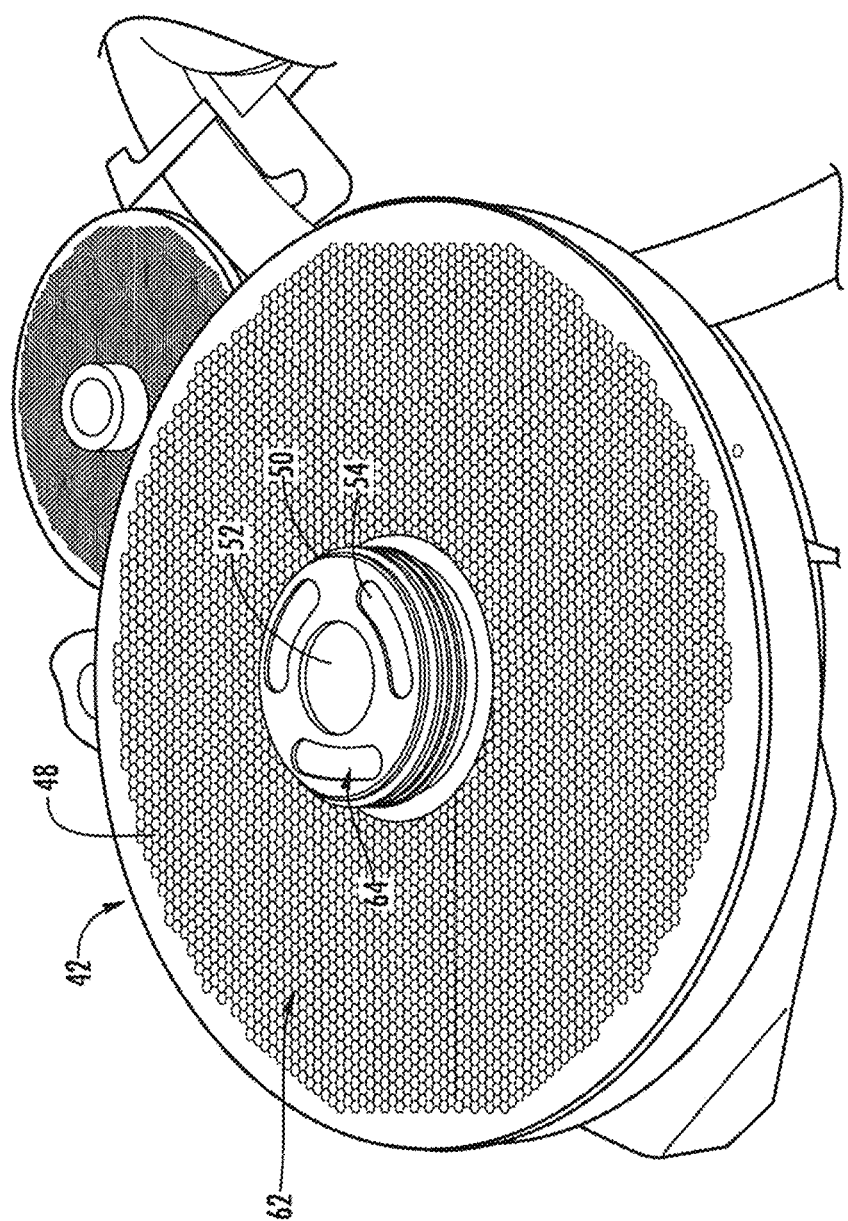
FIG. 4 illustrates a front perspective view of a first perforated plate of the meat grinding assembly of FIG. 1.
Figure 5:
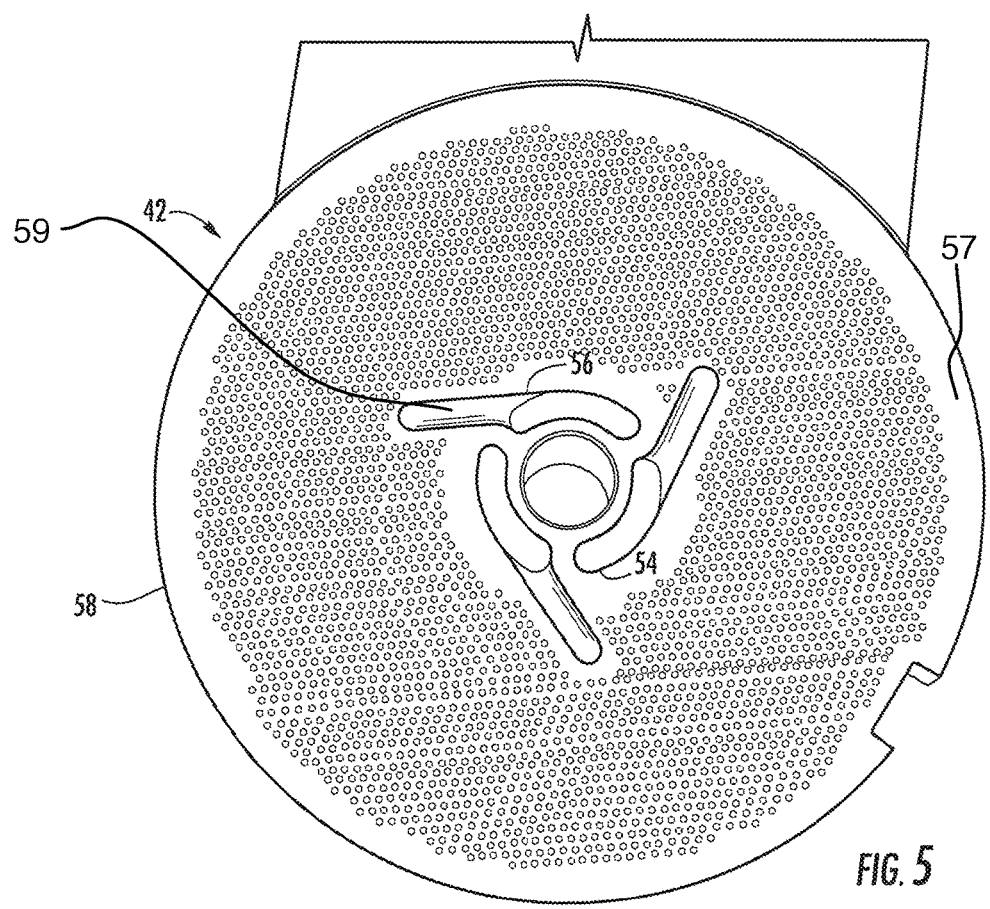
FIG. 5 illustrates a rear perspective view of the first perforated plate of the meat grinding assembly of FIG. 1.

The first perforated plate 42 is provided with a first plurality of holes 48 (FIGS. 2, 4 and 5). While the holes may be of any desired number and diameter, in the preferred embodiment, the number of holes is between 2-10,000, more preferably between 1,000-8,000, and most preferably between 2,000 and 7,000. In the preferred embodiment, the first perforated plate 42 is 4 inches to 24 inches in diameter, and more preferably 11 inches in diameter and provided with a center threaded hub 50 having a drive shaft opening 52 and curved openings such as a curved opening 54 and other supplemental curved openings 54. While the curved openings 54 may be of any suitable dimensions and need not necessarily be curved, in the preferred embodiment, the curved openings 54 are three elongated kidney-shaped openings having a width preferably between 1-100 times the largest diameter of the holes 48, more preferably between 2-10 times the largest diameter of the holes 48, and most preferably between 3-5 times the largest diameter of the holes 48.

As shown in FIG. 5, the first perforated plate 42 is provided with an indentation 56 and other supplemental indentations 56, each of which may be constructed with a flat, curved, sloped, or inclined surface that leads to one of the curved openings 54. The first perforated plate 42 is provided with a plate surface 55. FIG. 5. While the indentations 56 may be of any number or design, in the preferred embodiment, the indentations 56 are generally straight and extend from the edges of the curved openings 54 toward the outer circumference 58 of the first perforated plate 42. Extending the indentations 56 only partially to the perimeter of the first perforated plate 42 allows the first perforated plate 42 to be provided with more holes 48 near the perimeter. While the indentations 56 may be of any suitable configuration, as shown in FIG. 5, the indentations 56 preferably do not extend to within 25%, more preferably do not extend to within 40%, even more preferably do not extend to within 50%, even more preferably do not extend to within 60%, and most preferably do not extend to within 66%, of the radial distance to the perimeter of the plate 42 as measured from the center of the plate 42 to the perimeter of the plate 42. The rotary action of the flights 28 of the first drive shaft 26, and the knife inserts 40, working in concert with the difference in density between the meat 136 and the undesirable material causes the undesirable material to migrate towards the axis of rotation of the first drive shaft 26 before the meat 136 and the undesirable material arrive at the first perforated plate 42. Meat 136 approaching the outer region of the first perforated plate 42, more than ⅓ of the radius from the center, is void of undesirable material. As such, extending the indentations 56 to the perimeter first perforated plate 42 is not required. The indentations 56 need only extend outward as far as the undesirable material is distributed when the meat 136 and the undesirable material arrives at the first perforated plate 42. Preferably the indentations 56 extend no more than halfway, and more preferably no more than one third of the way to toward the perimeter of the first perforated plate 42.

Once at the first perforated plate 42, the balance of the migration of the undesired material relative to the meat 136 occurs along the face of the first perforated plate 42. With each indentations 56 in direct communication with one curved opening 54, the distance of travel of undesirable material is minimized, allowing for less total friction and preventing plugging of the interior rifling 18, indentations 56 and holes 48 and the stalling of collection of the undesirable material.

As shown in FIG. 2, the first grinder housing 16 is provided with a first inlet 60 in fluid communication with the hopper 24, a first outlet 62 defined by the holes 48 in the first perforated plate 42, and a second outlet 64 defined by the curved openings 54 in the first perforated plate 42. As shown in FIG. 2, the first stud pin 36 extends through the drive shaft opening 52 in the first perforated plate 42. A second grinder housing 66 is threaded onto the threaded hub 50 provided on the first perforated plate 42. The threaded hub 50 is a left hand ACME thread. The left hand threading of the hub in the application, specifically where the grinder is performing a final grind operation and reversing the direction of auger rotation is not available, is self tightening. Preferably, the ACME threads are provided with an increased lead angle. Higher lead angle means that the torque provided by the rotation of the first drive shaft 26 cannot over tighten the second grinder housing 66. Over a period of grinding, vibration and grinding torque causes UNC threaded connections associated with the prior art to overtighten resulting in a connection difficult to separate. The lead angle is preferably 5-20 times, more preferably 8-14 times and most preferably 11 times. This increased lead angle prevents the wedge of the threads from over tightening, resulting in a connection that is tight but easily undone after hours of grinding.

Figure 6:
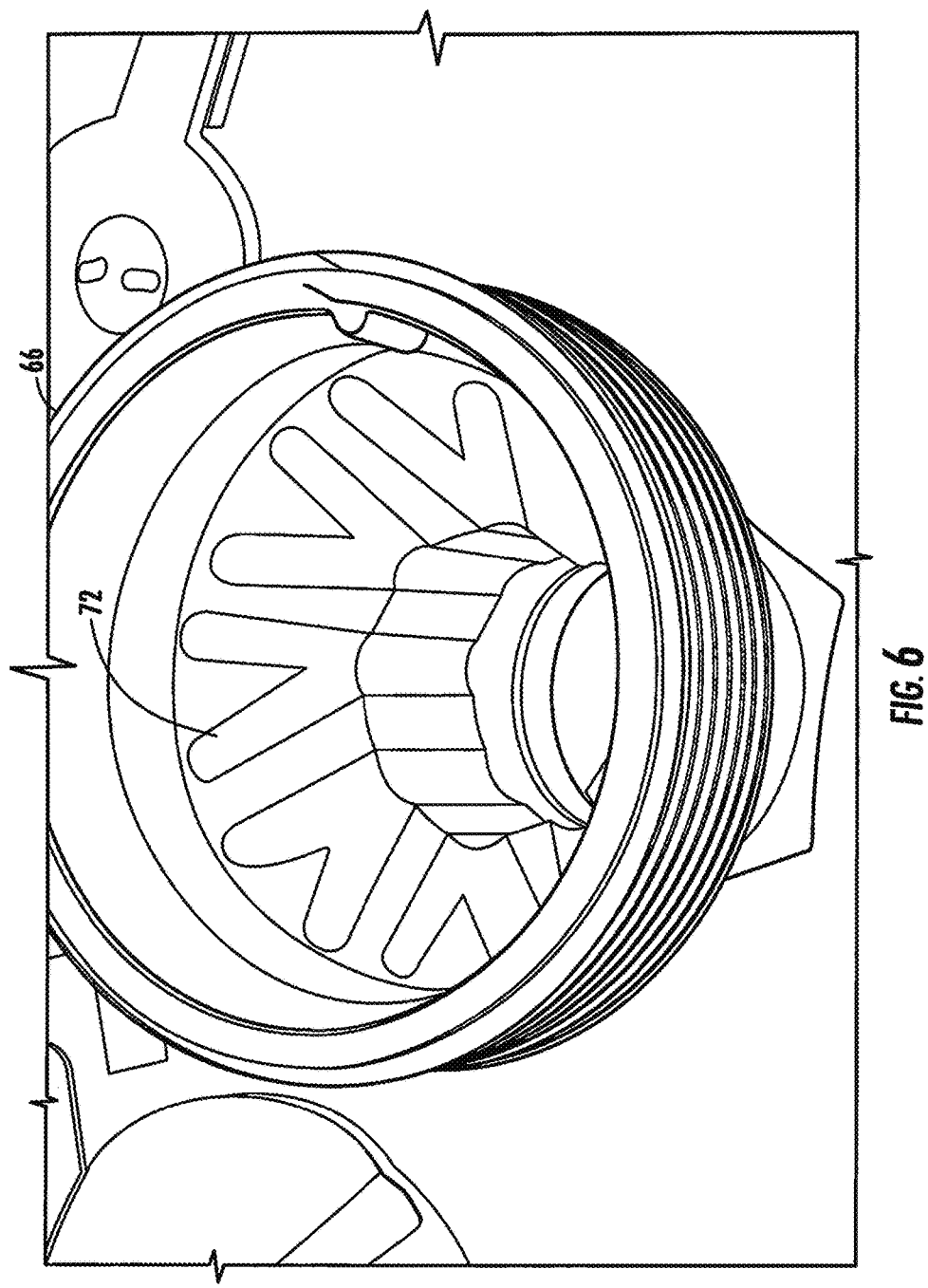
FIG. 6 illustrates a front perspective view of the second grinder housing of the meat grinding assembly of FIG. 1.
Figure 7:
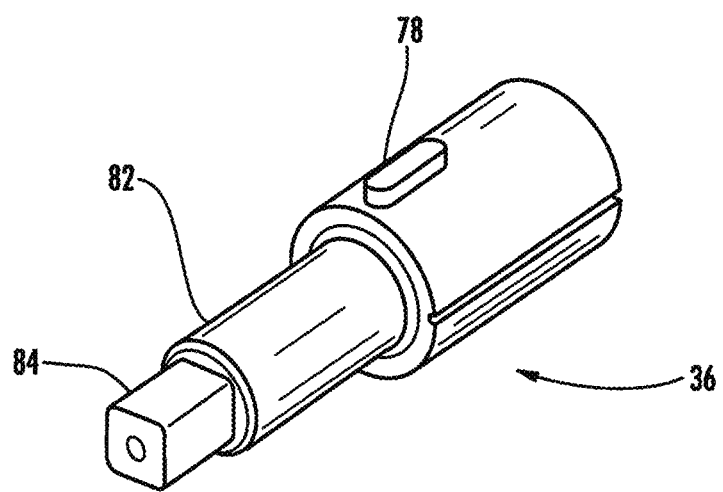
FIG. 7 illustrates a front perspective view of a first stud pin of the meat grinding assembly of FIG. 1.

The second grinder housing 66 may be of any desired configuration but is preferably provided with a cylindrical portion 68 that opens to a frusto-conical portion 70. As shown in FIG. 6, the interior of the second grinder housing 66 is provided with a plurality of recesses forming flutes 72 that allow the flights 74 provided on the second drive shaft 76 to move meat through the second grinder housing 66. As shown in FIG. 7, the first stud pin 36 is provided with a key 78 that locks into a keyway 80 provided in the first drive shaft 26. The first stud pin 36 is also provided with a narrower diameter shaft 82 on to which is frictionally fit the first knife blade holder 38 (FIGS. 2, 3 and 7). The first stud pin 36 is also provided with a square drive 84 that fits into a square slot 88 provided in the second drive shaft 76 (FIGS. 2, 3, 7 and 8b). In the preferred embodiment of the present invention, the drive shaft is constructed of the first drive shaft 26, the first stud pin 36, the second drive shaft 76, and a second stud pin 92. Alternatively, the drive shaft may be monolith, or constructed of any desired number of pieces.

Figure 8C:
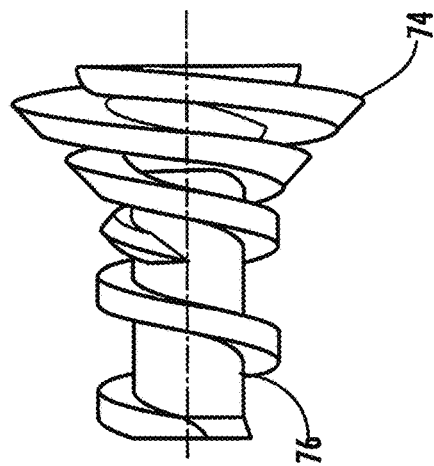
FIG. 8c illustrates a side elevation of the second drive shaft and flights of the meat grinding assembly of FIG. 1.
Figure 8B:
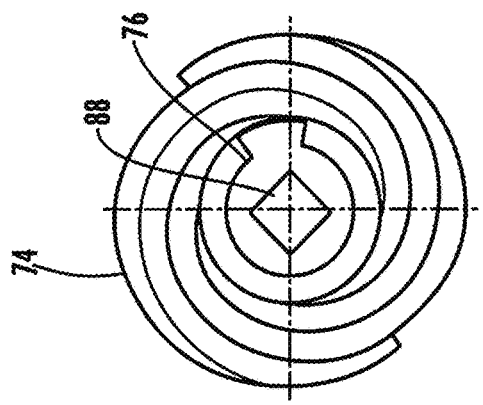
FIG. 8b illustrates a front elevation of the second drive shaft and flights of the meat grinding assembly of FIG. 1.
Figure 8A:
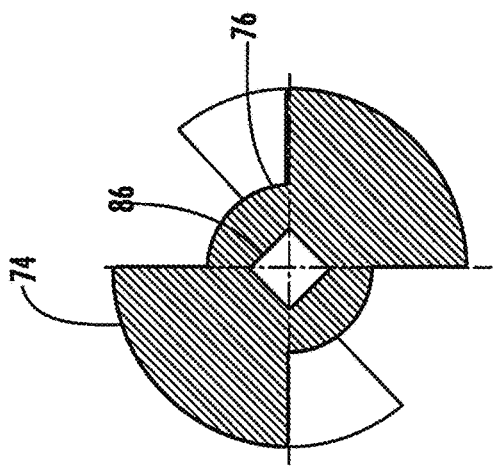
FIG. 8a illustrates a rear elevation of a second drive shaft and flights of the meat grinding assembly of FIG. 1.

As shown in FIGS. 8a-c, the second drive shaft 76 is provided with a first set of flights 74, and a second set of flights 75. The pitch of the flights 74 and 75 decreases as the flights 74 and 86 extend from the rear of the second drive shaft 76 to the front of the second drive shaft 76. The first set of flights 74 and the second set of flights 75 combine to maintain the correct pressure and centrifugal force on meat moving through the second grinder housing 66 to motivate the meat toward the exterior and concentrate undesirable material toward the center. The double wrap fighting and conical shape of the second drive shaft 76 yields better meat 136 flow control and separation of undesirable material. The pitch of the flights 74 is constant. To generate a reduction in screw volume, the flights 75 emerge from the second drive shaft 76. The aspect ratio between the flight thickness and the void between the flights 74 and 75 is ⅜" thickness to 1.5" pitch. When the flights 75 emerge from the second drive shaft 76, the volume of the second drive shaft 76 is reduced to 50% of the original volume. This geometry functions as a choke point that limits the amount of meat and undesirable material that can be transferred through the second meat grinder 14 and causes an increase in velocity and hydrodynamic pressure. Under such conditions, the undesirable material dislodges from the meat. Immediately following the choke point, the volume of the second drive shaft 76 increases rapidly due to the conical shape of the flights 74 and 75. The increase in volume decreases the velocity and hydrodynamic pressure and causes the dislodged undesirable material to precipitate out of the desirable meat under centrifugal force.

Figure 9:
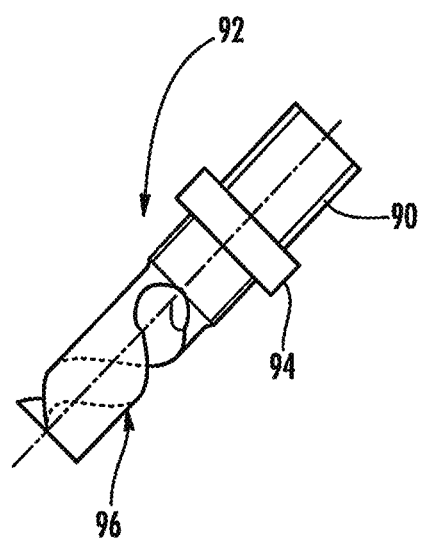
FIG. 9 illustrates a side elevation of the second stud pin 92 of the meat grinding assembly of FIG. 1.

The front end of the second drive shaft 76 is provided with a square opening 86 to accommodate the square drive 90 of the second stud pin 92. As shown in FIG. 9, the second stud pin 92 is provided with a cylindrical stop 94 and a square drive 93 to accommodate a second knife holder 98 which fits onto the square drive 93 of the second stud pin 92. As shown in FIGS. 2, 3 and 9, a set of knife blades 100 is also provided over the second stud pin 92 and into engagement with the second knife holder 98. While in the preferred embodiment, the set of knife blades 100 is monolith, the knife blades 100 may be separate and individually coupled to the second knife holder 98 either permanently, or replacably, if desired.

Figure 10:
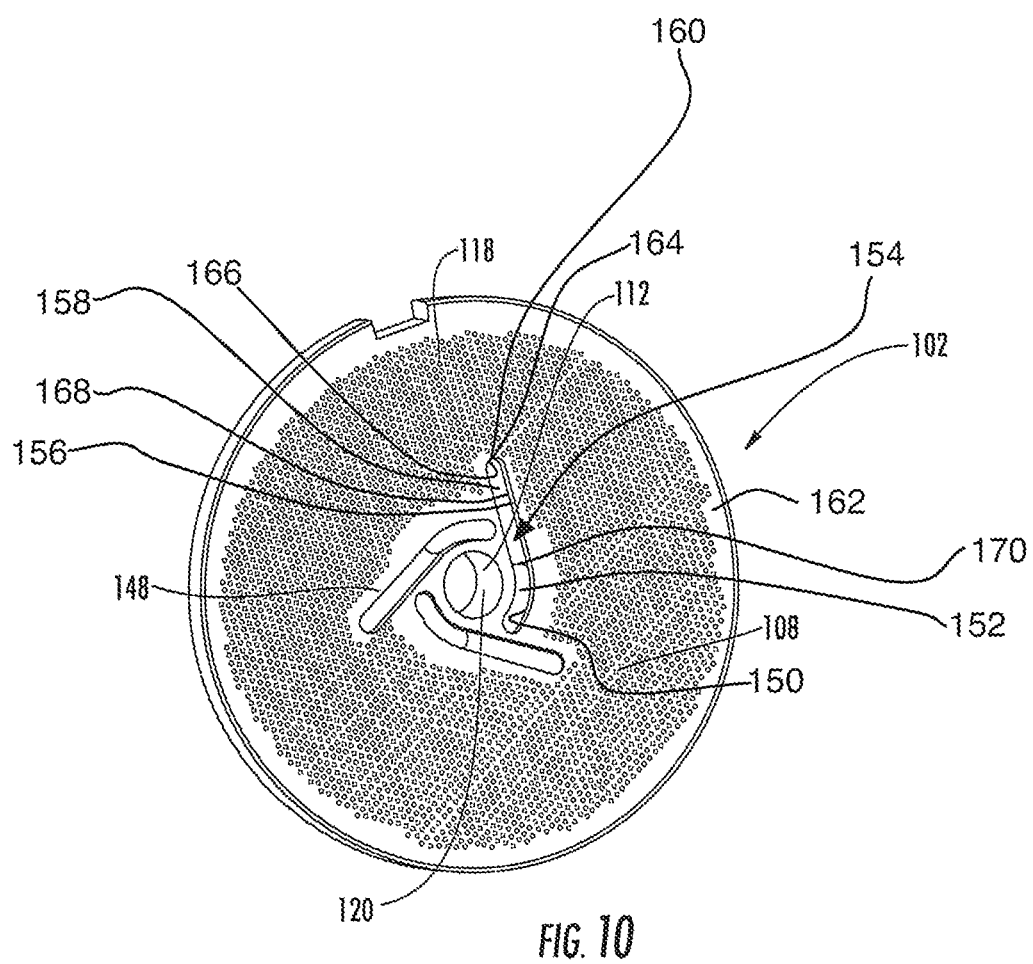
FIG. 10 illustrates a rear elevation of the second perforated plate of the meat grinding assembly of FIG. 1.
Figure 11:
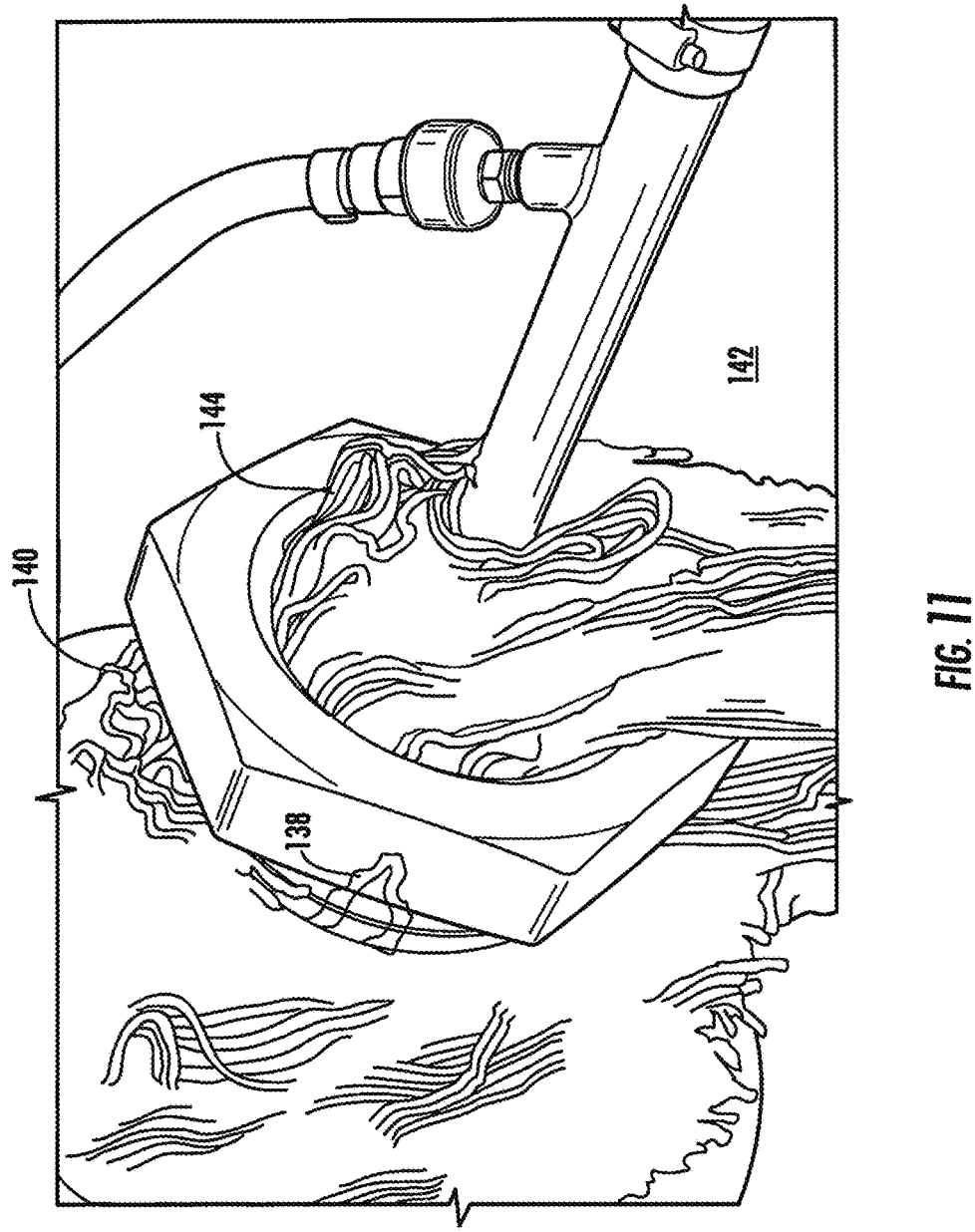
FIG. 11 illustrates a front perspective view in partial cutaway of the meat grinding assembly of FIG. 1.

Provided over the front of the second grinder housing 66 is a second perforated plate 102 (FIGS. 2, 3 and 10). The second perforated plate 102 is held in place by a second ring nut 104 screwed into mating engagement with second threads 106 provided on the exterior of the second grinder housing 66. While the second perforated plate 102 may be of any type known in the art, in the preferred embodiment, the second perforated plate 102 is a standard 5⅛" perforated grinder plate having a plurality of holes 108 and a center threaded hub 110 defining a discharge hole 112. The second stud pin 92 is provided with a helical groove 96 that acts as an auger to move undesirable material through the discharge hole 112. As shown in FIGS. 2-3, threaded on to the threaded hub 110 is a discharge tube 114, preferably at least 3" long. In this arrangement, the portion of the second grinder housing 66 provided over the curved openings 54 of the first perforated plate 42 forms an inlet 116 into the second grinder housing 66. As shown in FIG. 10, holes 108 in the second perforated plate 102 provide a first outlet 118 from the second grinder housing 66 and the discharge hole 112 provides a second outlet 120 from the second grinder housing 66.

Also provided on the second perforated plate 102 are three receiving walls 150 that define three curved openings 152. As shown in FIG. 10, the three receiving walls 150 are simply the interior walls of the three curved openings 152. The curved openings 152 are similar to those described above in reference to the first perforated plate 42. Like the first perforated plate 42, the second perforated plate 102 is provided with a plurality of indentations 154. As the curved openings 152 and indentations 154 are similar to one another, description will be limited to a single indentation 154 with it being understood that supplemental curved openings 152 and supplemental indentations 154 are preferably of a similar construction. The indentation 152 of the second perforated plate 102 is provided with a bottom face 158 and end wall 160. As opposed to the semi-circular cross-sections of the indentations 56 of the first perforated plate 42, as shown in FIG. 10, the cross-section of the indentation 154 of the second perforated plate 102 is rectangular, formed by a pair of sidewalls 156 and the bottom face 158. As shown in FIG. 10, a surface 162 of the second perforated plate 102 is coupled to the end wall 160 to define a first angle 164 therebetween. Similarly, the end wall 160 is coupled to the bottom face 158 to define a second angle 166 therebetween, and the sidewall 156 and the bottom face 158 define an angle 168 therebetween. The curved opening 152 is in communication with the indentation 154. The bottom face 158 is coupled to the receiving wall 150 of the curved opening 152 to define a third angle 170 therebetween.

As shown in FIGS. 2-3, a flexible hose 122 is secured over the discharge tube 114 with a hose clamp 124. The flexible hose 122 preferably discharges into a waste bin 126. As shown, an air compressor 128 is coupled via a hose 130 to straight or angled inlet 132 provided on the discharge tube 114. Provided along the hose 130 is a valve 134, such as those known in the art, to regulate the flow of air from the air compressor 128 into the discharge tube 114.

When it is desired to operate the meat grinding assembly 10 of the present invention, a quantity of meat 136, which is preferably more than 500 kg, is provided into the hopper 24. As the motor 30 turns the first drive shaft 26, the flights 28 grab the meat 136 and move the meat 136 forward from the hopper 24 into the first inlet 60 of the first grinder housing 16. The rifling 18 on the interior of the first grinder housing 16 co-acts with the flights 28 of the first drive shaft 26 to move the meat 136 forward, as opposed to simply spinning the meat 136 in place. The first drive shaft 26 forces the meat 136 at least partially into the holes 48 in the first perforated plate 42. The knife inserts 40 cut and grind the meat 136 into smaller portions that the first drive shaft 26 continues to push through the holes 48 in the first perforated plate 42. The remainder of the meat 136, including gristle, hard fat, connective tissue, sinew, bone, and foreign contaminants are too big to fit through the holes 48 in the first perforated plate 42. As the undesirable material is of a lower density than the meat 136, the combination of forces from the first drive shaft 26 and knife inserts 40 imparts centrifugal forces to the meat 136 and undesirable material, pushing the undesirable material toward the center of the first perforated plate 42. The speed of the motor 30 and pitch of the flights 28 are preferably such that rotation of the first drive shaft 26 leverages centrifugal force to drive meat 136 toward the perimeter of the first perforated plate 42 and undesirable material toward the interior of the first grinder housing 16. The first drive shaft 26 and knife inserts 40 continue to drive the undesirable material inward until the undesirable material contacts the indentations 56 provided in the first perforated plate 42, whereafter the pressure from meat 136 driven by the flights 28 and flutes 18 presses the undesirable material 138 along the indentations 56 and into the curved openings 54. Because the holes 48 of the first perforated plate 42 are smaller than the undesirable material 138, the undesirable material 138 cannot pass through the holes 48 of the first perforated plate 42. However, since the curved openings 54 are larger than the undesirable material 138, the undesirable material 138 exits the first grinder housing 16 through the second outlet 64 of the curved openings 54, while the meat 136 exits the first grinder housing through the first outlet 62. The system is designed to induct enough separated desirable meat through the curved openings 54 to ensure that all of the undesirable material is pushed through the curved openings 54. Failure to push some desirable separated meat through the curved openings 54 along with the undesirable material allows a portion of the undesirable material to accumulate in the primary grinder 12 until pressures escalate and undesirable material begins to be ground by the primary grinder 12.

Exiting the first grinder housing 16 through the first perforated plate 42, the ground meat 140 falls into a catch hopper 142 FIGS. 1, 2, 3 and 11). The processed material, including some desirable meat and the undesirable material 138 moves through the curved openings 54 into the second grinder housing 66 where the flights 74 coupled to the second drive shafts 76 co-act with the flutes 72 to drive the processed material 138 forward. As the flights 74 continue to contact the processed material 138, the flights separate reclaimed meat 144 from waste material 146, pushing the reclaimed meat 144 toward the perimeter of the second perforated plate 102 and concentrating the undesirable material 146, and some fat as the carrier of the undesirable material 146, toward the interior.

Processed material rich in undesirable material flowing into the second grinder is moved forward by flights 74. The geometry of the flights 74 functions as a throat, limiting the amount of processed material flowing to the second perforated plate 102, and causes a pressure rise that aides in the separation of meat and undesirable material and helps drive the undesirable material out of the discharge tube. As the flights 74 move the reclaimed meat 144 and undesirable material 146 forward, the second set of knife blades 100 cuts the reclaimed meat 144 into small enough pieces to pass through the holes 108 in the second perforated plate 102 and drives the undesirable material 146 along indentations 148 provided in the second perforated plate 102 and out the discharge hole 112 (FIGS. 1-4, 10, and 11). Accordingly, reclaimed meat 144 exits the second grinder housing 66 through the first outlet 118 of the holes 108 in the second perforated plate 102 while the waste material, substantially devoid of protein, with fat as the carrier, exits the second grinder housing 66 through the second outlet 120 which is the discharge hole. From the holes 108 of the second perforated plate 102, the reclaimed meat falls into the catch hopper 142 and is process along with the ground meat 140 as known in the art. The undesirable material 146, however, exits the discharge hole 112 into the discharge tube 114. As the flights 74 connected to the second drive shaft 76 continue to put pressure on the undesirable material 146, the undesirable material 146 moves through the discharge tube 114 into the flexible holes 122 and into the waste bin 126. In the event that the undesirable material 146 becomes stuck in the flexible hose 122, the valve 134 is actuated to move air from the air compressor 128 into the flexible hose 122 to continue the movement of the undesirable material 146 toward the waste bin 126. If desired, the valve 134 may be set with a predetermined amount of air pressure to keep the undesirable material 146 moving continuously into the waste bin 126 or intermittently as desired.

Although the invention has been described with respect to a preferred embodiment thereof, it is to be understood that it is not to be so limited, since changes and modifications can be made therein which are within the full, intended scope of this invention, as defined by the appended claims.

What is claimed is:

1. A meat grinding assembly, comprising:
   a. a housing;
   b. a feed screw provided at least partially within the housing;
   c. a knife assembly drivably coupled to the feed screw;
   d. a plate coupled to the housing; wherein the plate defines;
      (i) a plurality of holes;
      (ii) an indentation provided in the plate surface, wherein the indentation defines an end wall coupled to the plate surface and a bottom face coupled to the end wall;
      (iii) a curved opening in communication with the indentation, wherein the curved opening defines a receiving wall coupled to the bottom face of the indentation;
      (iv) wherein the plate surface and the end wall define a first angle;
      (v) wherein the end wall and the bottom face define a second angle; and
      (vi) wherein the bottom face and the receiving wall define a third angle.

2. The meat grinding assembly of claim 1, wherein the plate defines a center and a perimeter and wherein the indentation does not extend to within 25% of the radial distance to the perimeter as measured from the center.

3. The meat grinding assembly of claim 1, wherein the plate defines a center and a perimeter and wherein the indentation does not extend to within 40% of the radial distance to the perimeter as measured from the center.

4. The meat grinding assembly of claim 1, wherein the plate defines a center and a perimeter and wherein the indentation does not extend to within 50% of the radial distance to the perimeter as measured from the center.

5. The meat grinding assembly of claim 1, wherein the plate defines a center and a perimeter and wherein the indentation does not extend to within 60% of the radial distance to the perimeter as measured from the center.

6. The meat grinding assembly of claim 1, wherein the plate defines a center and a perimeter and wherein the indentation does not extend to within 66% of the radial distance to the perimeter as measured from the center.

7. The meat grinding assembly of claim 1, further comprising:
   a. a supplemental indentation provided in the plate surface, wherein the supplemental indentation defines a supplemental end wall coupled to the plate surface and a supplemental bottom face coupled to the supplemental end wall;
   b. a supplemental curved opening in communication with the supplemental indentation, wherein the supplemental curved opening defines a supplemental receiving wall coupled to the supplemental bottom face of the supplemental indentation;
   c. wherein the plate surface and the supplemental end wall define a fourth angle;
   d. wherein the supplemental end wall and the supplemental bottom face define a fifth angle; and
   e. wherein the supplemental bottom face and the supplemental receiving wall define a sixth angle.

* * * * *